(No Model.)
H. GILBERT.
HEDGE FENCE.
No. 264,276. Patented Sept. 12, 1882.
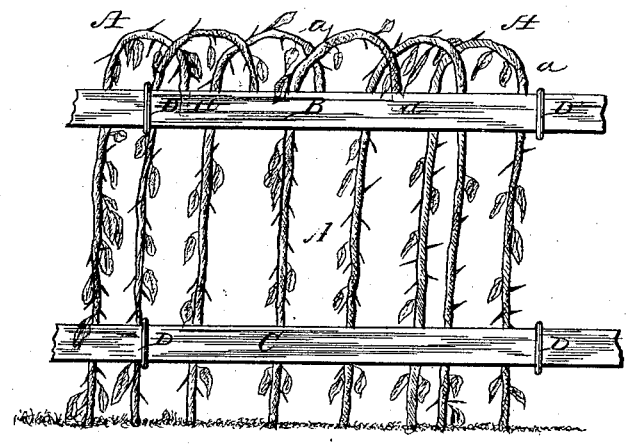
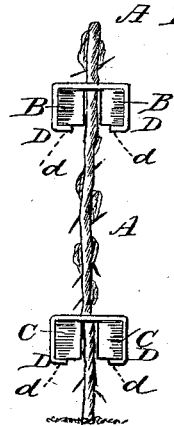
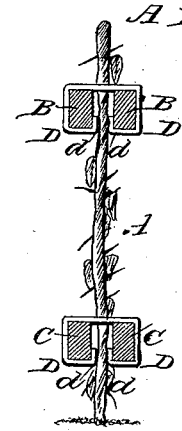
WITNESSES:
Fred. G. Dieterich
Jno. A. Madigan
Henry Gilbert
INVENTOR.
by Louis Bagger & Co.
ATTORNEYS.

UNITED STATES PATENT OFFICE.

HENRY GILBERT, OF FREMONT, OHIO.

HEDGE-FENCE.

SPECIFICATION forming part of Letters Patent No. 264,276, dated September 12, 1882.

Application filed June 17, 1882. (No model.)

*To all whom it may concern:*

Be it known that I, HENRY GILBERT, of Fremont, in the county of Sandusky and State of Ohio, have invented certain new and useful Improvements in Hedge-Fences; and I do hereby declare that the following is a full, clear, and exact description of the invention, which will enable others skilled in the art to which it appertains to make and use the same, reference being had to the accompanying drawings, which form a part of this specification, and in which—

Figure 1 is a side view of my improved hedge-fence. Fig. 2 is an end elevation of the same, and Fig. 3 is a vertical sectional view through the hedge with its clamping-bars and clamps.

Similar letters of reference indicate corresponding parts in all the figures.

My improvement relates to means for training or plashing living hedges of that class in which the canes are secured in position during their growth between bars arranged on opposite sides of the hedge; and it consists in the arrangement of said bars in their relation to each other and to the hedge as hereinafter more fully described, and particularly pointed out in the claim.

In the accompanying drawings, A represents the hedge, of any suitable hedge-plants. On opposite sides of the same are placed pairs of clamping-bars B B and C C, two or more rows or pairs, according to the height of the fence. Each pair of bars are held together by clamps D, made of any suitable metal, and having lips $d\ d$, which project in under the bars and operate to hold them in place when, during the growth of the hedge, the bars of each pair are spread apart by the increasing thickness or fullness of the plants between them. The clamps D should be made of any suitable metal that has sufficient "spring" or elasticity to press bars B B and C C firmly up against the canes on opposite sides thereof, so as to hold said bars in place simply by pressure against the canes inserted between them, and without the aid of supports of any other kind. This construction of the clamps will also, as stated above, permit the bars to spread apart without losing their hold upon the hedge, as the canes gradually increase in thickness during the growth of the hedge.

The tops of the plants are bent downwardly and clamped between the bars, as shown at $a$, Fig. 1. This having once been done, the fence will require no further training or other attention, except trimming when required.

I claim and desire to secure by Letters Patent of the United States—

The device for training or plashing living hedges herein shown and described, consisting of two or more pairs of parallel bars arranged on opposite sides of the hedge, and clamped thereto and against each other by spring-clamps D, having lips $d$ overlapping the bars on their under sides, as shown and set forth.

In testimony that I claim the foregoing as my own I have hereunto affixed my signature in presence of two witnesses.

HENRY GILBERT.

Witnesses:
 JOSEPH STRAUSBURGH,
 JOHN HINDS.